C. SCHENCK.
PRESSED STEEL WHEEL STRUCTURE AND METHOD OF MAKING THE SAME.
APPLICATION FILED FEB. 13, 1918.
1,404,410.
Patented Jan. 24, 1922.
2 SHEETS—SHEET 2.
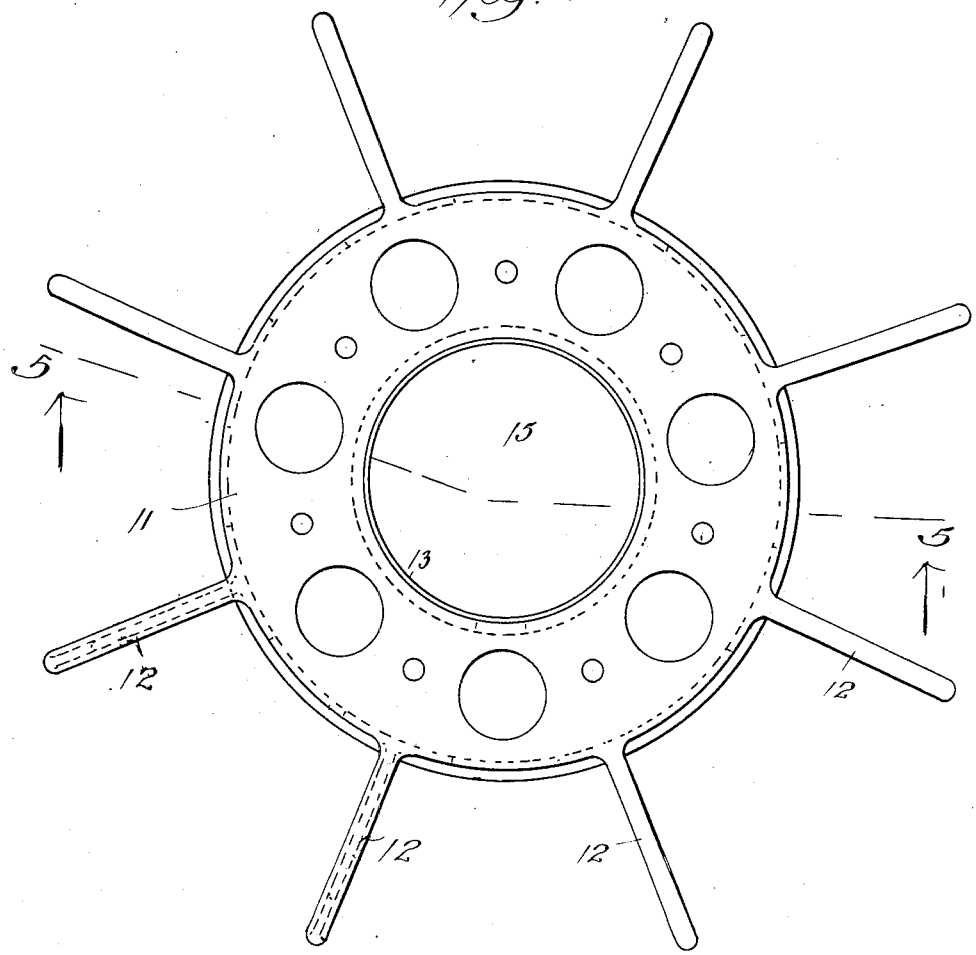
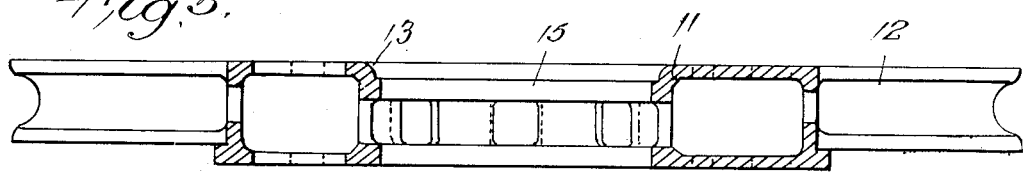
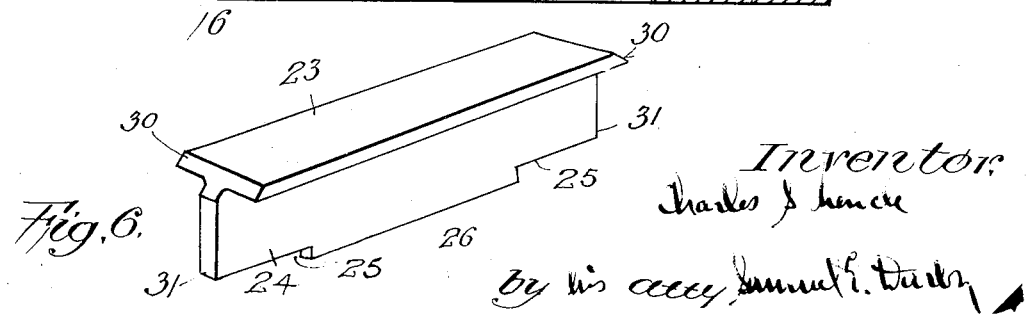

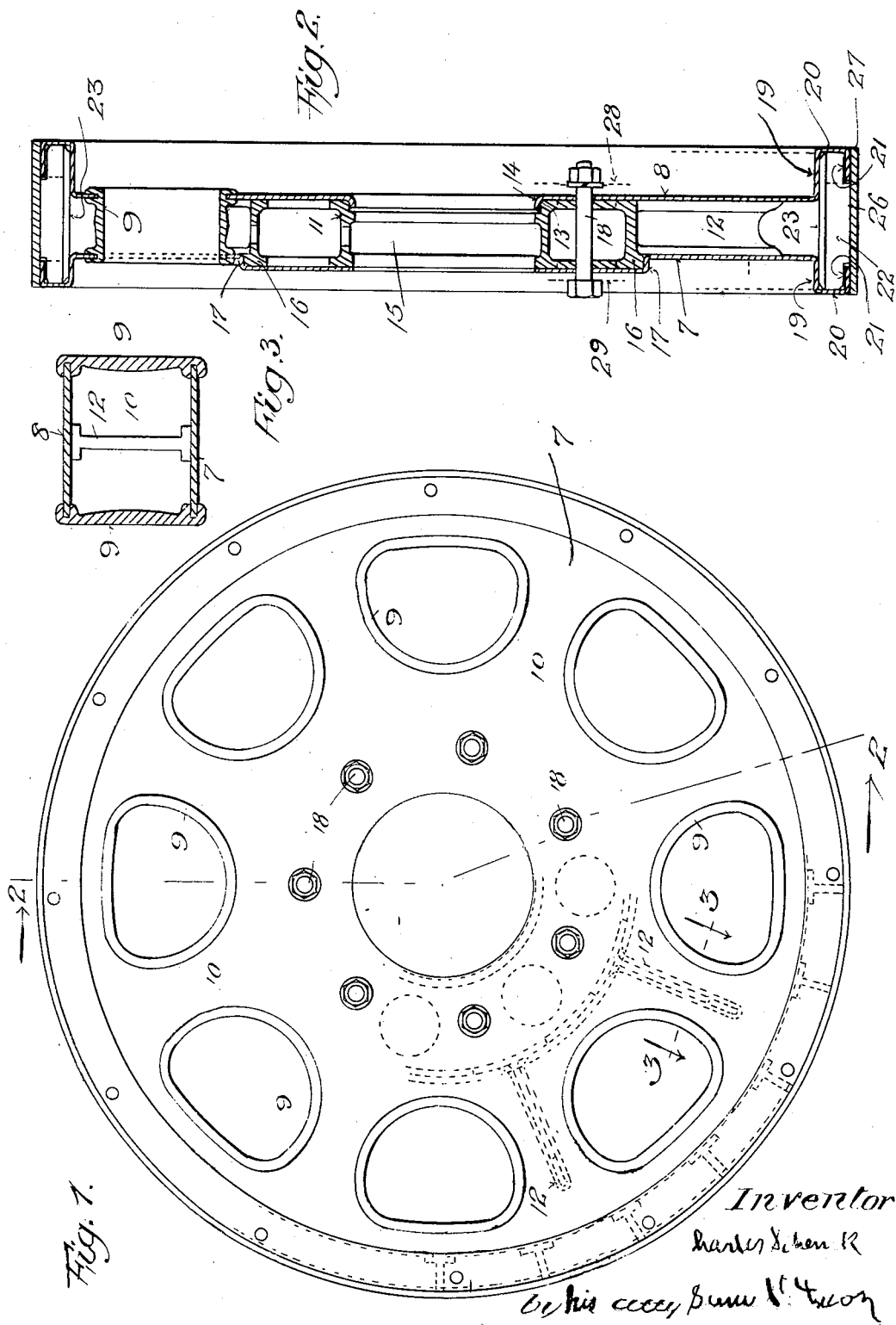

UNITED STATES PATENT OFFICE.

CHARLES SCHENCK, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

PRESSED-STEEL WHEEL STRUCTURE AND METHOD OF MAKING THE SAME.

1,404,410. Specification of Letters Patent. Patented Jan. 24, 1922.

Application filed February 13, 1918. Serial No. 216,909.

*To all whom it may concern:*

Be it known that I, CHARLES SCHENCK, a citizen of the United States, residing at Philadelphia, in the county of Philadelphia, State of Pennsylvania, have made a certain new and useful Invention in Pressed-Steel Wheel Structures and Methods of Making the Same, of which the following is a specification.

This invention relates to pressed steel wheel structures and method of making the same.

The object of the invention is to provide a pressed steel wheel structure which is simple, economical to manufacture, strong, durable, and efficient in operation.

A further object of the invention is to provide a reinforcement for a sheet steel wheel structure.

A further object of the invention is to provide a hub reinforcement for sheet steel wheel structures.

A further object of the invention is to provide a tire rim reinforcement for sheet steel wheel structures.

A further object of the invention is to provide an improved method of manufacturing sheet metal disc wheels.

Other objects of the invention will appear more fully hereinafter.

The invention consists substantially in the construction, combination, location, and arrangement of parts, all substantially as shown in the accompanying drawings as hereinafter described and finally pointed out in the appended claims.

Referring to the accompanying drawings:

Fig. 1 is a view in side elevation of a sheet steel wheel structure having rim and web or hub reinforcements embodying the principles of my invention.

Fig. 2 is a view in section on the line 2, 2, Fig. 1, looking in the direction of the arrows.

Fig. 3 is a view in section on the line 3, 3, Fig. 1, looking in the direction of the arrows.

Fig. 4 is a view in elevation, somewhat enlarged as compared with Fig. 1, of the web or hub reinforcing spider.

Fig. 5 is a view in section on the line 5, 5, Fig. 4, looking in the direction of the arrows.

Fig. 6 is a detached detail view in perspective of a rim reinforcing web member.

The same part is designated by the same reference numeral wherever it occurs throughout the several views.

Difficulty has heretofore been experienced in the manufacture of sheet steel wheels in producing a wheel structure, especially wheels of this class designed for use on motor trucks and other heavy vehicles, which are able to resist the heavy strains, thrusts and stresses imposed thereon in usage. Experience has shown that the points of greatest weakness in truck wheels made up of sheet steel stampings develop in the hub portion or web of the wheels. Experience has also shown that weaknesses develop in wheels of this character and type in the tire or tread portions thereof, particularly where an extended tire or tread surface is provided, and a wide tire tread is found desirable in motor truck wheels in order to avoid undue injury to the streets and pavements over which heavy vehicles operate, and also in order to increase the traction of the wheels. It is among the special purposes of my present invention to provide a pressed steel wheel structure with a web or hub reinforcement which is simple and efficient, and with a tire rim reinforcement whereby the wheel is rendered sturdy and rugged so as to enable it to withstand the rough usage to which wheels of this character are subjected.

Referring to the accompanying drawings: A sheet steel wheel embodying my invention is composed of the side plates or members 7, 8, of sheet steel in the form of disks pressed into the desired shape and separated by reinforcing spreader members 9 in a manner well understood, and as shown, described and claimed in the patent to Fulda, No. 1,177,179, March 28, 1916. The spreaders or spacers 9 form, in effect, radial hollow spoke portions indicated at 10, Fig. 3, intermediate adjacent spreaders or spacers, and the walls of which are formed by the plates 7, 8, and the adjacent portions of the spreaders or spacers 9. Interposed between the side plates 7, 8, is a circular spider member 11 in the form of a casting having a hollow hub portion with integral flanged radial arms 12 which extend radially into the hollow spoke portions 10. The spider casting 11 constitutes a hub reinforcement for the wheel, being formed with a central hub opening having a rounded shoulder 13 over and into engagement with which the bounding edge of the central opening in the wheel disk member 8 is pressed as indicated at 14. (See Fig. 2.) The peripheral edge of the central opening in the wheel disk 7 terminates flush with the central circular hub opening 15 of the spider casting. The spider casting hub is provided with a circumferential shoulder or radially extending flange 16 over which the wheel plate or disk 7 is pressed as indicated at 17. It will be observed that the shouldered engagement 13, 14, for the wheel disk 8, and the shouldered engagement 16, 17, for the wheel disk 7, are respectively disposed on opposite sides of the wheel. The flanged radial arms or projections 12 radiate from the periphery of the spider casting 11 and extend into the hollow spoke portions 10 as above described and past the concentric circle equi-distant between the periphery of the wheel and the hub, and the flanges of such arms bear respectively against the wheel disks 7, 8. The reinforcing spider casting with its radial arms or projections serves to take the thrusts and strains of the wheel in usage and secures a sturdy rugged wheel structure.

In order to reinforce the rim, particularly in the case of an overhanging or broad rim structure, the peripheral edges of the wheel plates 7, 8, are respectively bent outwardly away from each other as at 19 and then radially at 20, and finally inwardly towards each other as at 21, forming a box structure 22. Within this box structure are disposed brace members which extend transversely of the wheel rim with their ends extended respectively into the pockets formed by the bending, as above described, of the wheel plates at their peripheral edges. These brace members are formed with flat base portions 23, (see Fig. 6,) which rest upon the outwardly extending portions 19 of the wheel disks, and with the radial or web portions 24. This web portion is shouldered or cut away at each end as at 25 to form seats in which are received the inwardly bent wheel disk portions 21, leaving a raised rib 26 which projects through the opening between the opposed edges of the inturned disk flanges 21, and the outer surface of which lies flush with the outer or peripheral surfaces of the inturned flange portions 21. Circumscribing the whole rim is a ring member 27, which takes firm bearing against the outer surfaces of the edge flanges 21, and the outer surface of the rib 26 of the reinforcing member 24. The inturned flange portions 21 are seated upon the web portions 24 of the braces 23 to reinforce the flanges. All of the parts may be secured together by welding in any suitable or convenient manner. The disc plates 7 and 8 are preferably spot welded to the flanges on the radial arms 12, and the flat base portions 23 of the transverse brace members are connected to the flanges 19 of the disc plates by spot welding. It will be observed that the radial spider arms 12 do not extend to the periphery of the wheel, but this is a detail to which my invention is not to be limited.

In order to prevent too sharp a bend of the wheel disks 7, 8, around the ends of the rim reinforcing member 24, or the base 23 thereof, the ends of said member over which the sheet metal disks are bent are preferably bevelled off as indicated at 30, (see Fig. 6), and for a similar reason the corners 31 are also rounded off where the disk flanges 21 are bent thereover.

In assembling the wheels the disc plates 7 and 8 are first connected to the spider by spot welding. Then the transverse braces, having the brace portions 23, are slipped between the outer flanges 21 of the disc plates, and turned at right angles to seat their ends into the channels formed by the flanges 19 and 21. After these transverse braces have been so mounted, their base portions 23 are spot welded to the flanges 19. Finally, the metal rim is mounted in position on the transverse braces and the flanges 21.

A pressed steel wheel structure having the reinforcements above described may be detachably mounted upon an axle hub, and a brake drum may be applied in any suitable or convenient manner. I have indicated bolts 18, the function of which is to clamp the wheel upon an axle hub flange indicated in dotted lines at 28, and also securing a brake drum, a portion of which is indicated in dotted lines at 29, said bolt passing transversely through the reinforcing spider 11 and the wheel disks 7, 8.

The rim reinforcement above described provides for an extended or wide wheel tread or rim, and efficiently braces and sustains the same, and enables it to withstand the shock and rough usage to which wheels of this character are subjected in use.

Having set forth the objects and nature of my invention, and a construction embodying the principles thereof, what I claim as new and useful, and of my own invention, and desire to secure by Letters Patent, is:—

1. A pressed steel wheel structure comprising a spider having a hub portion and radial arms, said hub portion having engaging shoulders formed thereon at opposite ends thereof, and sheet metal disks having portions thereof bent over the shoulders at the opposite ends of said spider.

2. A pressed steel wheel structure comprising a spider having a ring-shaped hub portion and radial arms formed integrally with each other and sheet steel disks applied to opposite faces of said spider and bent over engaging shoulders formed thereon.

3. A pressed steel wheel structure comprising a spider having a hub portion and integral radial arms in combination with sheet steel disks applied to opposite faces of said spider, said hub portion having engaging shoulders at opposite ends thereof over which said disks are bent, said shoulders being located at relatively different radial distances from the axis of the spider hub portion.

4. A pressed steel wheel structure comprising a spider having a hub portion and radial arms integral therewith, said hub portion having a rounded shoulder in the hub opening thereof on one side and a radial flange at the other side thereof, and steel disk members applied to opposite sides of said spider and respectively bent over said shoulder and flange.

5. A pressed steel wheel structure comprising a reinforcing spider having flanged radial arms in combination with sheet steel disks applied to opposite faces of said spider, and spreader members separating said disks and forming wheel spoke portions, said arms extending into said spoke portions and having their flanges secured to the inner surfaces of said disks.

6. A pressed steel wheel structure comprising a spider having a hub portion and radial flanged arms integral therewith in combination with sheet steel discs respectively applied to opposite faces of said hub portion and having portions thereof bent over shoulders formed on the opposite faces or ends of said spider, the flanges of said radial arms being secured to the inner surfaces of said discs.

7. A pressed steel wheel structure comprising a spider having a hub and radiating flanged arms formed integrally therewith in combination with sheet steel disks respectively applied to opposite faces of said spider, and having spreader members interposed therebetween to form hollow wheel spoke portions, said flanged arms extending into said spoke portions and having the flanges thereof secured to the inner surfaces of said disks.

8. A pressed steel wheel structure comprising sheet steel disks having their peripheral edges bent inwardly toward each other, and a reinforcing rim member disposed transversely between the peripheral edges of said disks and having depressed seats formed in the ends of the outer surface thereof to receive and form seats for said inwardly bent portions.

9. A pressed steel wheel structure comprising sheet steel disks having interposed spreader members, said disks at their peripheral edges being bent outwardly away from each other, then radially, then finally inwardly toward each other to form a chamber, reinforcing rim members disposed in said chamber and extending transversely of the planes of said disks, said reinforcing rim members having recessed seats in the outer surfaces thereof at their ends to receive the inturned extreme peripheral edge flanges of said disks, and a rim ring applied over said inturned flanges and reinforcing members.

10. A pressed steel wheel structure comprising sheet steel disks having interposed spreader members and transversely extending reinforcing rim members, said reinforcing rim members having bevelled end portions over which the peripheral portions of said disks are bent.

11. In a metal disc wheel, two wheel discs having laterally extending seating surfaces near their peripheries, metal braces mounted on the seating surfaces and extending at right angles to the planes of the wheel discs, and a rim mounted on said braces and the wheel discs.

12. In a metal disc wheel, two wheel discs having laterally extending seating surfaces near their peripheries, metal braces mounted on the seating surfaces and a rim mounted on said braces and the wheel discs.

13. In a metal disc wheel, two wheel discs having laterally extending seating surfaces near their peripheries, metal braces each having a base seated on said seating portions, and a radial web portion, and a rim mounted on said web portions and said wheel discs.

14. In a metal disc wheel, two wheel discs each having a groove or channel adjacent its periphery and forming an inner and outer flange, and metal braces extending into said channels and mounted on the inner flanges.

15. In a metal disc wheel, two wheel discs each having a groove or channel adjacent its periphery and forming an inner and outer flange, and metal braces each having a base portion and a radial web portion, said braces extending into said channels, and the web portions thereof extending between said outer flanges.

16. In a metal disc wheel, two wheel discs each having a groove or channel adjacent its periphery and forming an inner and outer flange, and metal braces each having a base portion and a radial web portion, said braces extending into said channels, and the web portions thereof extending between said outer flanges, said web portions having depressed seats on their outer edges to receive said outer flanges.

17. In a metal disc wheel, two wheel discs constructed to form channels adjacent their peripheries, a plurality of separate braces extending into said channels at right angles to the planes of the discs and having projections extending between the peripheral flanges formed by the outer sides of the channels, and a rim mounted on said projections and said flanges.

18. A metal wheel consisting of a central spider or frame constituting radial spokes and two side plates secured together and against the faces of the spokes, each side plate being provided with an annular groove at its periphery, a metal rim seated upon the edge of said side plates, and reinforcing metal pieces bridging said plates at their peripheries and located in said grooves at points in the periphery thereof between the spokes.

19. A metal wheel comprising a spider of radially disposed spokes, side plates or members embracing the spider and fastened together against the same, a metal rim seated on the outer periphery of said side plates and transverse reinforcing members secured to said side plates at the rim.

20. A metal wheel comprising a spider of radially disposed spokes, side plates or members embracing the spider and fastened together against the same, a metal rim seated on the outer periphery of said side plates and transverse reinforcing members joining said side plates together at the rim.

21. A metal wheel comprising a spider of radially disposed flanged spokes, side plates or members embracing the spider and fastened together against the same, a metal rim seated on the edges of the side plates and transverse reinforcing metal pieces welded to said side plates in the spaces between the spokes and having a bearing against the rim.

22. A metal wheel comprising two side plates or members each provided with an annular peripheral groove, a plurality of reinforcing metal pieces located in said grooves and bridging said plates at their peripheries and a metal rim seated on the peripheries of said side plates.

23. A metal wheel comprising two side plates each provided with an annular groove at its periphery, a plurality of reinforcing metal pieces bridging said plates at their peripheries and welded to said plates in said grooves and a metal rim seated on the peripheries of said side plates.

24. A metal wheel comprising two side plates each provided with an annular peripheral groove and a plurality of T-shaped reinforcing pieces located in the groove and extending transversely to the plane of the wheel between said plates.

25. In a metal disc wheel, two wheel discs having laterally extending seating surfaces near their peripheries, metal braces mounted on the seating surfaces, and a rim mounted on said braces.

26. In a metal wheel, a rim, braces, and two wheel discs having outer laterally extending portions upon which the rim is mounted, and inner laterally extending portions upon which the braces are mounted, the braces forming strengthening means for the outer laterally extending portions.

27. In a metal wheel, the combination of a wheel disc having a channel forming a peripheral flange, and a series of braces mounted in said channels and forming a support for the peripheral flange.

28. In a metal wheel, the combination of a wheel disc having a channel adjacent its periphery forming an inner flange and a peripheral flange, a series of braces seated on the inner flange and supporting the peripheral flange, and a spider unit having radially extending bars connected to the side of the disc.

29. In a metal wheel, a spider having flanged metal bars forming radial spokes, two wheel discs embracing and secured against the flanges of said bars, the wheel discs being provided with peripheral flanges, extending toward each other, and a rim mounted on said flanges.

30. In a metal wheel, flanged metal bars forming spoke members, and two wheel discs secured together and against the flanges of the bars, and having annular grooves adjacent their peripheries.

31. A metal wheel comprising a spider of radially disposed spokes, side plates or members embracing the spider and fastened together against the same, a metal rim seated on the outer periphery of said side plates and transverse reinforcing members secured to said side plates at the rim, the radii of the discs extending through the spokes being between the adjacent transverse members.

32. In a metal wheel the combination of a spider having radiating spoke members, a disc plate secured against said spider, said plate having an inturned flange at its center and a channel adjacent its periphery to form a peripheral flange, and braces mounted in said channel and supporting the peripheral flange.

33. In a metal wheel, the combination of a central frame having radiating spoke members, a pair of wheel discs both secured to the central frame, reinforcing members between the spokes and secured to the discs, and transverse members secured to the discs adjacent their peripheries and beyond the reinforcing members.

34. A method of manufacturing metal disc wheels which consists in connecting the wheel discs to radially extending spoke members, and subsequently slipping cross braces into channels formed at the peripheries of the wheel discs to connect the same thereto.

35. A method of manufacturing metal disc wheels which consists in connecting the wheel discs to radially extending spoke members, subsequently slipping cross braces into channels formed at the peripheries of the wheel discs to connect the same thereto, and then mounting a metal rim on the peripheral portions of the discs and the cross braces.

36. A method of manufacturing metal disc wheels which consists in fastening the wheel discs to reinforcing and separating means between the discs, and subsequently slipping cross braces into channels formed at the peripheries of the wheel discs and fastening the same thereto.

In testimony whereof I have hereunto set my hand on this 8th day of Feb. A. D., 1918.

CHARLES SCHENCK.